Nov. 21, 1961　　　J. S. SWICK　　　3,009,304
HEAT SEALING APPARATUS AFFORDING EASY
AND QUICK LOADING AND UNLOADING
Filed March 1, 1961
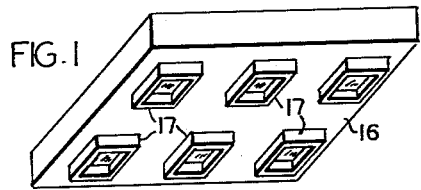
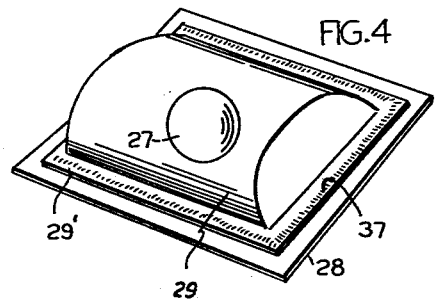
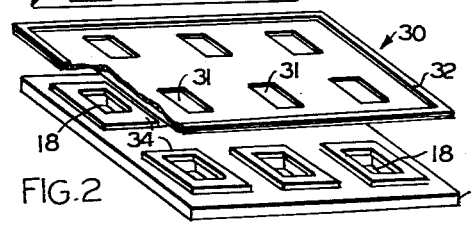
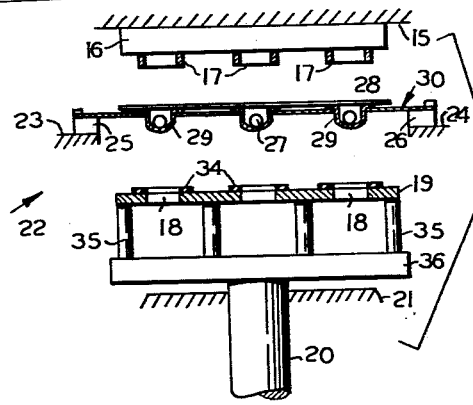
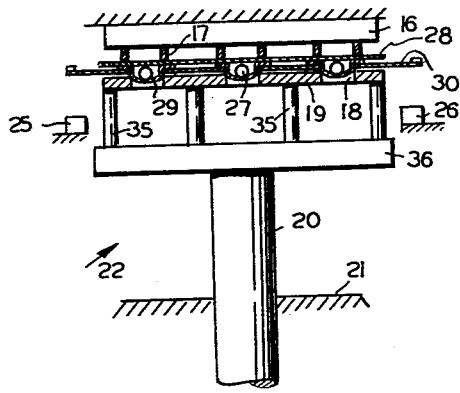
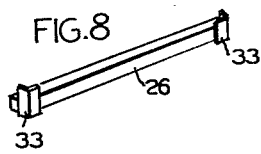
INVENTOR,
JOSEPH S. SWICK,
BY
ATTORNEY

United States Patent Office 3,009,304
Patented Nov. 21, 1961

3,009,304
HEAT SEALING APPARATUS AFFORDING EASY AND QUICK LOADING AND UNLOADING
Joseph S. Swick, New York, N.Y., assignor to Tronomatic Machine Mfg. Corp., Bronx, N.Y., a corporation of New York
Filed Mar. 1, 1961, Ser. No. 102,340
7 Claims. (Cl. 53—373)

The present invention relates to the packaging art and more particular to improvements in heat-sealing press apparatus for seaming the outward rim flange of a transparent cup or blister containing the article to be packaged, onto a cardboard sheet or the like, whereby such article is viewably housed within the chamber formed.

A press apparatus of this type usually heretofore used, consists of an upper heated sealing die means on a ram movable towards a work holder therebeneath, which includes a fixed plate having the required number of spaced openings to receive laden blisters set inverted therethrough with their rim flanges resting on flat rubber rings secured on such plate, one around each of its openings.

After placing a cardboard sheet having a plastic film on one surface so that such surface rests on the flanges of the mounted blisters and of course covering the mouths of said blisters, the heated die means is moved downward to press on the cardboard in the ring region around each blister and thus effect the seaming of the flanges to said cardboard surface. The die is then raised, ready for the next operation after the finished work is removed and new pieces to be operated on, are placed in the work holder.

In such operation, one period of time is spent to place the laden blisters into the openings or cavities of the stationary work holder. Upon completion of the seaming operation, another period of time is spent to remove the work from the press. Then time is spent to reload. Quicker operation would necessitate that there be at least three work holders, easily settable and removable from the press, so that while the press is working with one, the just-removed one holding finished work, could be emptied and a third can be loaded to be ready to be set in the machine. However, this is not always practical because the cost of the work holders is rather high.

Further, the apparatus heretofore used, often failed to make a proper seam. Many a time there remained openings along the blister's flange, which of course is objectionable.

It is therefore the principal object of this invention to provide a novel and improved apparatus of the type set forth of special construction and mode of operation, which will seam properly and which with auxiliary work holders of very low cost, will provide for quick operation in the preferred suggested manner.

A further object thereof is to provide a novel and improved apparatus of the character mentioned, to work on many blisters all at once, and receive a similar new load on removal all at once of the blisters just worked on, which upon the next operation of the machine, will all at once be properly automatically mounted in the main work holder of the press, ready to be acted on by the heated die means.

A further object of this invention is to have the auxiliary work holder laden with a new load to be worked on, to serve as the means which acts to accomplish perfect sealing of the blisters' rim flanges to the cardboard member.

Still another object thereof is to provide a novel and improved heat-sealing press apparatus having the attributes mentioned, which is easy, simple and low in cost to manufacture and operate and which is efficient in carrying out the purposes for which it is designed.

Other objects and advantages will become apparent as this disclosure proceeds.

For the practice of this invention, one form it may assume, is to have a press apparatus in which there is a fixed heated die means, spaced above an upwardly and downwardly movable, pressure-applying ram carrying a main work-holding means including a plate provided with openings, each opening being suitable to receive an inverted blister therein with its flange resting on a rubber gasket which is on said plate, one around each of said openings. For each blister, the die presents a ring in alignment with each gasket respectively. The size and shape of each ring die and its cooperative gasket and of course the openings in the main work-holder's plate are in accordance with the requirements of the blisters to be worked on.

Spaced above said work-holding plate and to each side end thereof, there is fixed to the frame below the die means, a support for the side end of an auxiliary work-holder which is essentially a quite thin flat sheet, resiliently deformable, but upon release of all force, will assume substantially flat condition. By way of example, I recommend a paper-thin steel sheet for this purpose. This sheet has spaced openings therein corresponding to the openings or cavities in the main work holder plate.

One function of this thin resilient normally flat sheet is to serve as a toting tray, to be loaded with laden blisters outside the press, then brought to rest atop said fixed supporting members to be in alignment with the openings in the main work holder which is fixed on the press. Upon operation of the machine, the said main work holder in its upward movement toward the heated die means, intercepts the loaded auxiliary work holder, whereupon the blisters enter the respective openings therefor in the moving main work holder, and upon pressure being applied by the ram, the flanges become heat-sealed to the cardboard which had been placed atop the laden auxiliary work holder when the latter was on its temporary rest.

A more detailed description of such new machine will now be set forth together with its novel mode of operation, for which I will resort to the accompanying drawing which is part of this specification and in which similar characters of reference indicate corresponding parts in all the views.

FIG. 1 is a perspective view of the dies carried on the underside of their heater structure.

FIG. 2 is a perspective view of the plate of the main work-carrying member of the press, which plate moves vertically with the ram of the machine.

FIG. 3 is a perspective view showing one of the auxiliary work-holders.

FIG. 4 is an enlarged perspective view of a blister mounted on a cardboard and housing an article within the chamber formed thereby. This machine makes many such packages each time it is operated. Preferably the multiplicity of blisters constituting a load are all heat-sealed onto a single cardboard sheet which is cut apart after removal from the press, as is well known in this art.

FIG. 5 shows a front view of a machine which embodies the teachings of this invention, shown in condition ready to operate on a load of blisters to secure them onto a common cardboard sheet. The framework of the machine is indicated diagrammatically by showing parts thereof by symbolic showing in order to attain simplicity and clarity of illustration.

FIG. 6 is similar to FIG. 5, but shows the machine in condition where it is sealing the work.

FIG. 7 is an enlarged fragment of FIG. 6.

FIG. 8 is a perspective view of support and locating means for the auxiliary work holders.

In the drawing, the frame part designated by the numeral 15 fixedly carries the heater structure 16, from the underside of which, the sealing dies 17 extend respectively aligned with the blister-receiving openings 18 of the main work-holding plate 19 which is carried by the ram 20 mounted for vertical movement in the frame part indicated as 21. In normal rest condition of the press apparatus denoted generally by the numeral 22, said main work-holding plate 19 is spaced from said sealing dies 17. Intermediate said dies and plate member, the frame parts 23, 24 carry the bars 25, 26 to support the side ends of an auxiliary work-carrying member indicated generally by the numeral 30; these supporting bars being one at each side end of the press beyond said dies 17 and the plate 19, so that upon upward movement of the ram 20 and the plate 19 which it carries, the latter will intercept the auxiliary work-holding member 30, and carry it and its load of blisters 29 covered by a common cardboard sheet 28, to the sealing dies 17, to package the articles 27 in the closed chambers formed. All frame parts 15, 21, 23 and 24 are of course a unitary structure.

The auxiliary work-carrying member 30, is a paper-thin sheet characterized in that it is normally flat, but highly resilient and I recommend steel sheeting for this purpose. This sheet is provided with spaced openings 31 to receive inverted laden blisters 29; said openings corresponding with the shape and arrangement of the dies 17 and the openings 18 of the plate 19. When this member 30 is of appreciable expanse, it is advisable to provide it with a stiffening border frame 32 at a distance from the openings 31 so as not to diminish the resiliency of this thin sheet in its regions around the said openings. Suitable locating means, as for instance the angle pieces 33, may be provided at the remote corners of the bars 25, 26, to hold said auxiliary work-carrying member 30 when set therebetween, so that openings 31 are in register with the dies 17 and the openings 18 of plate 19. Said locating pieces 33 are not shown in FIG. 5, in order to attain clarity of illustration. The main work-holding plate 19 has fixed thereon, a flat resilient gasket 34, as of rubber, around the perimeter of each of its openings 18. In order to accommodate relatively deep blisters 29, the plate 19 may be on spacers 35 extending upwardly from the platen 36. It is evident that the cost to make the auxiliary work-holder 30 is extremely cheap in comparison to what the plate 19 and its appurtenances would cost.

To operate the press 22, one auxiliary work-holding member 30 is loaded outside the machine with inverted laden blisters 29 and then is set on the supporting bars 24, 25, properly located by the angle pieces 33. A cardboard sheet 28 whose underside is coated with a thermoplastic film, is set on the flanges 29' of the thermoplastic blisters 29; the flanges resting on the metal sheet 30. This is the condition shown in FIG. 5 where the dies 17 are maintained hot by the heater means 16. Now operating the press so that the ram 20 moves upwardly, the plate 19 will receive the blisters 29 in its openings 18 and the rubber gaskets 34 will contact the resilient sheet 30 opposite the blister flanges 29'. Now, upon continued upward movement of the ram, the loaded member 30 will be carried upward until the press assumes the condition shown in FIG. 6. Here, the ram 20 applies pressure. Each ring die 17 will heat a blister flange 29' through the cardboard 28 and the plastic film ring on the cardboard adjacent said flange and cause them to weld together by a heat sealed seam indicated at 37. While such pressure is applied, the gaskets 34 will be compressed and the resiliency of the thin metal sheet 30 cooperating, said metal sheet will conform to the contour of the surface of the flange which it contacts in toto and thus assure that the sealing seam 37 is endless. Being of metal, the sheet 30 will conduct any heat it receives, to the blister flange 29', where before, the heat received by the blister flange was not retained, because one surface of the blister rested on the gasket 34. Now, the blister flange 29' receives heat by conduction on one surface from the heated die 17 and by radiation from the metal sheet 30 to the other surface. The auxiliary member 30 therefore evidently serves not only as a transporting member for the work to and from the press, but also to effect a perfect sealing seam 37.

After a sufficient lapse of time, the ram 20 is lowered, thereby carrying the member 30 with its finished load of blisters attached to the cardboard. Upon continued downward movement of the ram, said member 30 will be intercepted by the bars 24, 25 and the machine will again assume the condition shown in FIG. 5. In the meantime another member 30 has been loaded outside the machine and is set onto the bars 24, 25 after removal of the first member 30 and thereby finished load. While the first member 30 is stripped of its finished load, a third member 30 may be loaded with new work pieces and the machine operated to work on the load carried in the machine by the second member 30.

The blisters may be of any size, shape and contour and of course the sealing dies 17, the openings 31 and the openings 18 are made to suit in each instance.

As is well known, the finished work which comprises a multiplicity of blisters attached to a single sheet 28, are cut apart in units as shown in FIG. 4, by cutting the cardboard sheet 28 between flanges 29'.

This invention is capable of various forms and numerous applications without departing from the essential features herein disclosed. It is therefore intended and desired that the embodiment shown herein and the particular details mentioned, shall be deemed merely illustrative and not restrictive and that the patent shall cover all patentable novelty herein set forth; reference being had to the following claims rather than to the specific description herein to indicate the scope of this invention.

I claim:

1. In a heat sealing press for seaming the flange of a flanged thermoplastic blister onto a backing sheet, a frame, a heat-receiving sealing die fixed to the frame, adapted to apply heat to said flange through said backing sheet, a main work holder positioned below said die, having an opening in the top thereof to receive the blister, a flat resilient gasket secured atop said main work holder around said opening, a pressure-applying ram mounted on the frame for movement towards and away from said die, carrying said main work holder, an auxiliary work holder which is essentially a highly resilient, normally substantially flat sheet member having an opening to receive and hold a blister in inverted position therethrough so that the flange of such blister rests atop said resilient sheet, structure fixed to the frame, positioned to permit the ram to move the main work holder to the die, releasably supporting said auxiliary work holder so said auxiliary work holder is liftable off therefrom by the main work holder upon upward movement of the ram; said auxiliary work holder resting on said supporting structure, between and spaced from said die and gasket, predetermined distances respectively; said die and the openings in the work holders being in alignment and said openings being of a size so that the blister fits therein.

2. An apparatus as defined in claim 1, wherein the resilient sheet member of the auxiliary work holder is of heat-conductive material.

3. An apparatus as defined in claim 1, including means for properly locating the auxiliary work holder when set onto said support structure, fixed on one of them.

4. An apparatus as defined in claim 1, including an additional number of heat-receiving dies similar to the one mentioned and wherein the resilient sheet is provided with said number of additional openings similar to the opening in said sheet mentioned and wherein the main work holder is provided with said number of additional openings similar to the opening in said main work holder mentioned; each of the dies being in spaced relation to the others and in alignment with one of the openings in each of the work holders respectively, and each of the openings in the main work holder having a resilient gasket secured therearound atop said main work holder.

5. An apparatus as defined in claim 4, wherein the resilient sheet member is of heat conductive material.

6. An apparatus as defined in claim 4, including means for properly locating the auxiliary work holder when set onto said support structure, fixed on one of them.

7. An apparatus as defined in claim 4, including a stiffening frame around the resilient sheet member; said frame being spaced from the openings in such member so as not to diminish the resilient character of said sheet in the lanes thereof around said openings to any appreciable extent.

References Cited in the file of this patent

UNITED STATES PATENTS

| | | |
|---|---|---|
| 1,479,156 | Prescott | Jan. 1, 1924 |
| 2,363,014 | Nicolle | Nov. 21, 1944 |
| 2,494,484 | Nicolle | Jan. 10, 1950 |